United States Patent [19]

Kyhl

[11] Patent Number: 5,025,320
[45] Date of Patent: Jun. 18, 1991

[54] VIDEO IMAGING PODIUM
[75] Inventor: Henry Kyhl, Englewood, N.J.
[73] Assignee: Buhl Industries, Inc., Fair Lawn, N.J.
[21] Appl. No.: 404,077
[22] Filed: Sep. 7, 1989
[51] Int. Cl.[5] .......................... H04N 5/30; H04N 7/18
[52] U.S. Cl. ..................................... 358/229; 358/93; 379/202
[58] Field of Search ................ 358/229, 906, 909, 93, 358/102, 335, 85, 185; 354/293, 94; 224/908; 379/53, 202; 434/307, 324, 323, 331, 333, 371

[56] References Cited

U.S. PATENT DOCUMENTS

| | | | |
|---|---|---|---|
| 2,484,379 | 10/1949 | Goldberg | 358/185 |
| 3,755,623 | 8/1973 | Cassagne | 358/85 |
| 3,800,441 | 4/1974 | Macpherson | 358/185 |
| 4,730,218 | 3/1988 | Goodrich | 358/102 |
| 4,758,887 | 7/1988 | Engel et al. | 358/85 |
| 4,821,307 | 4/1989 | Flint | 379/53 |

FOREIGN PATENT DOCUMENTS

| | | | |
|---|---|---|---|
| 3431902 | 3/1986 | Fed. Rep. of Germany | 358/85 |
| 0280817 | 12/1987 | Japan | 358/85 |

Primary Examiner—James J. Groody
Assistant Examiner—Safet Metjahic
Attorney, Agent, or Firm—Darby & Darby

[57] ABSTRACT

A compact podium, of substantially conventional apperance, conceals therein a video camera and optical system. Illustrative materials, inserted into a slot at the speaker's waist, fall within the field of the camera after reflection from two mirrors. A two-way mirror serves as one reflector in the optical system and also as the sloped portion of the podium. The speaker looks through the two-way mirror and sees his illustrative material which is simultaneously displayed as a video picture. There is an unobstructed line of sight between the presenter and his audience.

12 Claims, 1 Drawing Sheet

VIDEO IMAGING PODIUM

BACKGROUND OF THE INVENTION

This invention relates generally to a speaker's podium of the type used in boardroom meetings, conferences, trade conventions, training classes, etc. and more particularly to a speaker's podium having incorporated therein means for projecting images of the speaker's illustrative materials on large screen television displays.

With the development of high resolution video CCD cameras, a need has arisen for using such cameras to "look" at documents, objects, illustrations and transparencies used in a boardroom environment, at meetings, etc., and to convert the documents, objects, etc. into video signals for projecting the images, in many instances, on large screen television displays.

To date, most of the devices for displaying a speaker's illustrative materials to the attendant group or audience mount a camera on a copy stand about two feet above the object or illustration. The camera takes pictures of whatever is placed beneath. This results in a cumbersome system which interferes with the relationship, at least aesthetically, between the speaker and his audience. Other devices conceal a video camera in a projector using a mirror on an extended arm above the documents which are being presented. Again, this blocks the view between the speaker and his audience and in many instances requires motions and actions on the part of the speaker which interrupt his spoken communication with the audience. Generally, a large cumbersome arm is positioned between the presenter and his audience.

What is needed is a video imaging podium which provides an unobstructed view between a speaker and his audience, allows the speaker to make his presentation in a conventional speaking manner, and provides a concealed convenient means for facilitating video display of the speaker's illustrative materials while also permitting the speaker unobstructed view of the materials on the podium.

SUMMARY OF THE INVENTION

Generally speaking, in accordance with the invention, a speaker's podium is provided which is especially suitable for facilitating video display of the speaker's illustrative materials. A very compact podium, of substantially conventional appearance, conceals therein a video camera and an optical system. Illustrative materials are inserted into a slot approximately at the height of the speaker's waist where the materials fall within the field of the video camera after reflection from two mirrors. A two-way mirror serves as one reflector in the video camera's optical system and also as the sloped portion of the podium. While making his presentation, the speaker may look through the two-way mirror and see his illustrative material which is being simultaneously displayed as, for example, an overhead video picture. The speaker can also place his notes on the sloped surface of the two-way mirror and continue his presentation as with a conventional podium without seeing the materials within the podium, which are simultaneously presented by video display. The podium provides excellent human engineering characteristics. There is an unobstructed line of sight between the presenter and his audience. When the presenter looks through the two-way mirror at his illustrative material which is in the slot of the podium, it appears to the audience as though he is reading from his notes on the top of the podium.

Accordingly, it is an object of this invention to provide an improved speaker's podium having concealed therein elements of a system for presenting illustrative material in video format.

Another object of this invention is to provide an improved speaker's podium which allows for presentation of illustrative materials without disturbing the presenter's normal position, or altering his view or actions, relative to the audience.

A further object of this invention is to provide an improved speaker's podium which is compact in size, conventional in appearance and eliminates a need for external devices to facilitate presentation of video display of illustrative materials.

Yet another object of the invention is to provide an improved speaker's podium which is convenient and comfortable to use.

Still other objects and advantages of the invention will be apparent from the specification. The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 2:
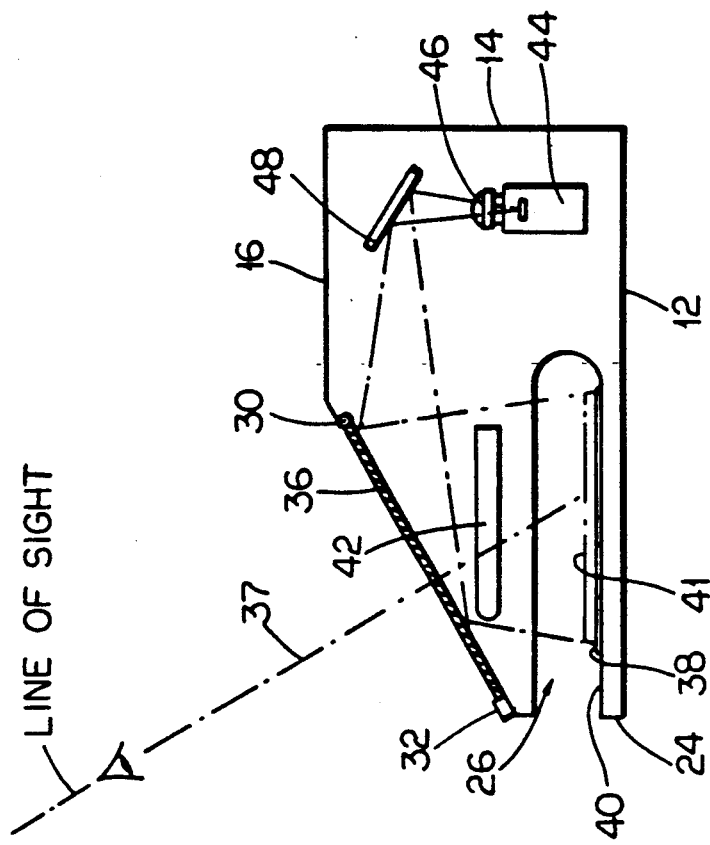
FIG. 2 is a side sectional view of the speaker's podium taken along the line 1—1 of FIG. 1.
Figure 1:
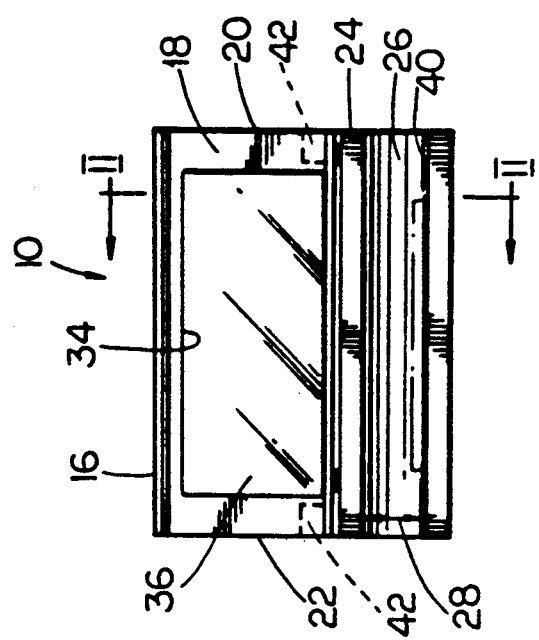
FIG. 1 is a front elevational view of the speaker's podium made in accordance with the invention.

With reference to the figures, the speaker's podium 10 in accordance with the invention includes a base 12, back 14, top 16, sloping face 18 and sides 20, 22. A front surface 24 has a slot 26 which extends from one side 20 to the other side 22 in width and in depth extends inwardly to the extent that a vertical projection (FIG. 2) of the sloping face 18 falls entirely within the slot 26. The slot height 28 is sufficient to allow a person to put his hand into the slot with ease as explained more fully hereinafter. The sloping face 18 is held to the body of the podium 10 by means of a hinge 30 so that the sloping face may be pivotably raised, pivoting around the hinge 30. A stop or ledge 32 at the lower end of the sloping face 18 serves to prevent papers and books used by a speaker from sliding off the podium.

A two-way mirror 36 is positioned in an opening 34 in the sloping face 18. A person is able to look through the mirror 36 into the enclosure of the podium 10 as indicated by the broken line 37. A platen 38 is fixed to the floor 40 of the slot 26 in a position where one looking through the two-way mirror 36, as would be conventional for a speaker using the podium 10, is able to see the platen 38 with an unobstructed view. An object 41, illustrated in FIG. 2 as being a flat sheet-like object, when placed upon the platen 38 is entirely viewable by the speaker without obstruction. The speaker positions the object 41 on the platen by sliding it into the slot 26 and placing it on the platen. The platen may include suitable markings for alignment of the object. The displayed materials can include documents, illustrations, transparencies and also three dimensional pieces. Where a piece is not suitably inserted through the slot 26, the sloping face 18 including the two-way mirror 36 may be raised by pivoting about the hinge 30. Then the object is placed on the platen 38. Indirect light sources 42, for example, fluorescent tubes, illuminate the platen 38 and any object 41 placed thereon.

A video camera 44 is positioned vertically within the podium 10 with the lens 46 directed toward an angled reflector 48.

The sloped surface of the two-way mirror 36 within the podium is reflective such that light falling on the object 41 reflects up to the underside of the two-way mirror 36 and is reflected therefrom to the angled reflector 48 which directs the image to the lens 46 of the video camera 44. Signals generated by the video camera 44 are delivered to an external video system (not shown) which converts the signal into a video display which may be of large size and positioned well over the head of the speaker and his audience. During the course of the speaker's presentation, the speaker and the video camera are both able with unobstructed vision to view the illustrative materials located on the platen 38. No external camera holding device, visible to the audience, is used.

In an alternative embodiment of a speaker's podium in accordance with the invention, the platen is translucent or transparent and illuminated from below so that transparencies may be positioned thereon and viewed by the video camera for presentation.

It should also be understood that in an alternative embodiment of the invention, the reflector 48 may be eliminated or further reflectors may be used with the reflector 48 to convey an image to the video camera 44. The optical system may vary as the optics within the video camera 44 vary and as new optical systems develop. Additionally, in an alternative embodiment of a speaker's podium in accordance with the invention, the user may see the object 41 indirectly through an intermediate reflector (not shown) between the object 41 and the two-way mirror 36.

In use, the podium 10 in accordance with the invention is placed upon a pedestal which raises the podium to a comfortable height for the speaker, for example, with the slot 26 being at the region of the speaker's waist. The speaker stands before the podium (to the left as seen in FIG. 2). Notes and reference books may be placed on the horizontal upper surface 16 or on the sloping mirror 36. Microphones may be positioned on the top surface 16, and so on. When the speaker decides to illustrate his talk with some graphics or by showing an object, he need only slip it into the slot 26 and place it face up on the platen 38. The speaker can view the illustrative material through the two-way mirror 36 if he so desires. Whether the speaker directly views the illustrative materials through the two-way mirror or not, the camera 44 views the illustrative material by way of the reflective inner surface of the two-way mirror 36 and the reflector 48. Signals, as stated above, from the video camera 44 are transferred to external electronic circuits. The end result is that a video picture of the illustrative material is made available for large screen viewing and also on small screens where such electronic arrangements are provided. During the presentation, the speaker may change the displayed materials as he speaks, and a camera ON/OFF switch (not shown) is available to the speaker. Undoubtedly devices for automatically feeding a sequence of items for display, at the speaker's demand, can be developed and used with the podium 10.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A speaker's podium for use in boardrooms, meetings, training classes, auditoriums, and the like in conjunction with display of the speaker's illustrative materials, comprising:
    an enclosure having a height that is lower than the speaker to permit an audience to view the speaker and being defined by a plurality of surfaces including a top surface, said top surface having a first opening therethrough and being spaced below eye level of the speaker;
    at two-way mirror positioned in said first opening, a first side of said mirror being reflective, said first mirror side facing the interior of said enclosure, the second side of said mirror being at least partially transparent and facing outwardly of said enclosure;
    support means being at least partially within said enclosure for supporting illustrative materials, said materials being visible to the speaker from outside of said enclosure by viewing directly through said two-way mirror when the speaker looks downwardly at the podium;
    and camera means within said enclosure and positioned to receive light reflected from said illustrative materials by way of said reflective first mirror side when said illustrative materials are supported by said support means, all of the surfaces of the enclosure being spaced below eye level of a speaker to enable the speaker to have both an unobstructed view in a horizontal direction over said enclosure and an unobstructed view downwardly through said mirror when viewing from any position which is above the mirror.

2. A speaker's podium as claimed in claim 1, and further comprising access means for permitting transfer of said illustrative materials between said support means and the exterior of said enclosure.

3. A speaker's podium as claimed in claim 1, and further comprising illumination means within said enclosure, said illumination means providing light on said support means and on any illustrative materials supported thereon.

4. A speaker's podium as claimed in claim 1, wherein said two-way mirror is in a sloped orientation.

5. A speaker's podium as claimed in claim 4, wherein said support means includes a flat horizontal surface for receiving said illustrative materials thereon.

6. A speaker's podium as claimed in claim 1, and further comprising a reflector, said reflector being positioned in the light path between said two-way mirror and said camera means.

7. A speaker's podium as claimed in claim 6, wherein said camera means includes a vertically oriented camera.

8. A speaker's podium as claimed in claim 1, wherein said camera means includes a video camera.

9. A speaker's podium as claimed in claim 2, wherein said access means includes a second opening in said enclosure, said illustrative materials being subject to passing through said second opening for engagement with and separation from said support means.

10. A speaker's podium as claimed in claim 9, wherein said second opening is a slot, said slot being positioned at least in part between said two-way mirror and said support means.

11. A speaker's podium as claimed in claim 10, wherein said slot is substantially horizontal.

12. A speaker's podium as claimed in claim 1, wherein said enclosure also includes a flat surface which extends from said top surface in a horizontal direction so that the view by the speaker is unobstructed when viewing over the flat surface as well over the top surface.

* * * * *